Inventor:
Pierre Gabriel Laurent
By: Spencer & Kaye
Attorneys

Inventor:
Pierre Gabriel Laurent
By: Spencer & Kaye
Attorneys

United States Patent Office 3,445,747
Patented May 20, 1969

3,445,747
HIGH-VOLTAGE POWER CONVERSION ASSEMBLY COMPOSED OF A POLYPHASE TRANSFORMER COMBINED WITH A PLURALITY OF SETS OF CONTROLLED RECTIFIERS
Pierre Gabriel Laurent, Paris, France, assignor to Electricite de France (Service National), Paris, France, a French body corporate
Filed Apr. 11, 1966, Ser. No. 541,834
Claims priority, application France, Apr. 16, 1965, 13,546; Apr. 4, 1966, 56,243
Int. Cl. H02m 7/08
U.S. Cl. 321—5                                                     6 Claims

ABSTRACT OF THE DISCLOSURE

A conversion assembly for use in a high-power, high-voltage converter, which assembly includes a polyphase transformer having one wound column per phase, with the secondary windings of the wound columns being divided into a plurality of winding elements and with each set of winding elements being associated with a set of low-voltage controlled rectifiers to define a plurality of elementary conversion stages which are connected together in series to form a high-voltage assembly, the phases of at least one of the elementary stages being formed by connecting together portions of the elementary winding elements of that stage.

---

Figure 1:
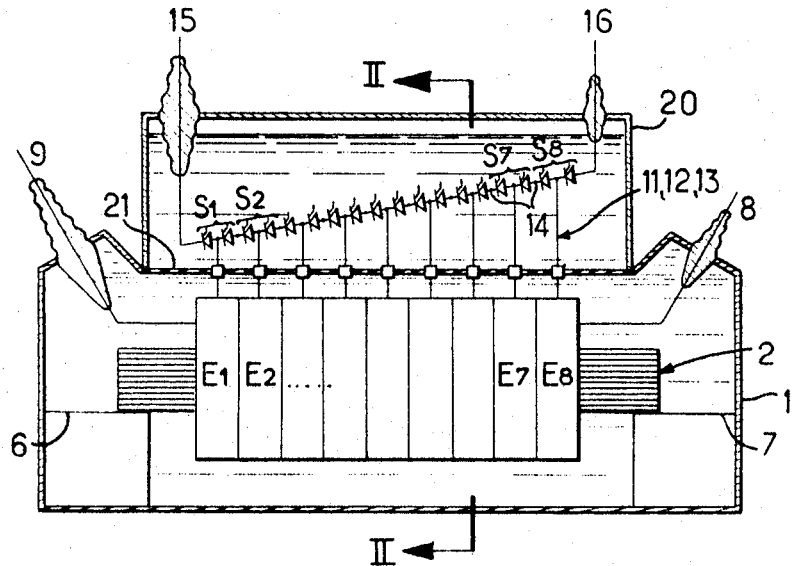

The present invention relates to the static high-power, high-tension converters, of the kind which in association with at least one transformer comprise a set of variable conductivity valves or of rectifiers of the controlled type for preference, e.g. diodes or valves, thyratrons, or thyristors. These converters are applicable in particular for convesion of alternating current into direct high-tension current or vice versa, and more generally for the exchange of energy between two systems at different frequencies. High-power converters of the very high tension type are understood to mean, in this case, units which assure the conversion of power of the order of at least tens of megawatts at potentials of the order of at least hundreds of kilovolts.

The development of variable conductivity elements of considerable simplicity and of appreciable, although moderate unit power, and specifically of elements whose phase at the instant at which they become conductive, and contingently that of the instant at which they cease to be conducive, may be controlled by low power devices, makes a more satisfactory co-ordination between the variable conductivity elements and the winding elements of transformers with which they are associated both possible and desirable.

It may be recalled in particular that installations built so far in the sphere of conveying energy by means of high-tension direct current, employed mercury vapour valves provided with grids for controlling the "striking" instants. These valves are costly and must be provided with a great number of auxiliary devices, so that efforts have been made up to now to produce valves having as great a unit power as possible, in such a way as to reduce the cost and complexity of the installations. The valves in use at pressent have inverse peak voltages which occasionally approach 200,000 volts, and the power convertible by an elementary set of valves, for example a set of six valves connected in the form of a Graetz bridge, is comparable to the unit powers of the windings of the largest transformers. On the other hand, it is known however that semi-conductor devices have displaced mercury vapour valves in a great number of their applications at relatively low potential, and it has been suggested that they will equally be applicable in converters of the very high tension type. The efforts devoted to this end were primarily directed however towards replacement as the sole aim, of mercury vapour valves by blocks or batteries of a great number of controlled striking or response semi-conductor valves, in series or series-parallel connection in such manner as to produce unit powers comparable to those of mercury vapour valves, the connection diagrams of these blocks and of the transformer windings remaining approximately the same. The assembly in series of great numbers of controlled response semi-conductor valves raise difficult problems however in respect of response control and of voltage distribution. The arrangements applied with conversion blocks of great unit power do not make it possible to exploit the possibilities accruing from the application of individual elements of low power.

A main object of the present invention is to remedy these shortcomings by a modification in the conditions of co-operation of the variable conductivity valves with the transformer windings with which they are associated.

According to the invention a static high power, high-tension converter for energy exchange between an alternating current system and a direct current system or between two alternating current systems of different frequency, comprising at least one polyphase transformer having one wound column per phase associated with a battery of variable conductivity valves having low unit operating potential as compared to the potentials brought into play in the conversion, the transformer winding directly associated with the valves being sub-divided into a plurality of elements of which each, together with an associated set of valves, forms an elementary conversion stage of polyphase characteristics, the assembly of these stages connected in series forming a conversion assembly, the phases of the winding element in at least some of the elementary stages being established by connection in series of turns belonging to at least two of the columns of the transformer.

The invention is applicable to a converter employed independently or linked with other analogous members, formed by the combination of a three-phase transformer and variable conductivity valves, the winding of the transformer associated with the valves being subdivided into a great number of elements of which each, together with a set of associated valves, forms an elementary conversion stage of three-phase or better six phase characteristic, the different conversion stages thus formed being connected in series.

Another object of the invention is to exploit the properties of an arrangement of this nature to form high-power, high-tension converter assemblies of easier construction, which are more compact and have better characteristics than the existing converters or those already described. Among the improvements which are thus desirable in the performance of the conversion assemblies of the kind in question, it is apt to emphasize the reduction of the harmonics factor in the grids fed for conveying and distribution of the energy made to undergo conversion. In point of fact, one becomes more and more conscious of the many disadvantages caused by the presence of harmonics in a distribution grid, namely, over voltages engendered by superimposition of harmonics on the highest voltages, overheating of motors, alternators and static condensers, induction of interference signals in telephone networks, and cause of errors in subscribers meters, all these disadvantages being aggravated by the dangers of resonance.

In order to reduce these shortcomings, one is reduced to resort to harmonics filters in existing installations, whose cost price may occasionally exceed that of the main transformers themselves.

According to the present invention, a considerable reduction in the harmonics factor is obtained by multiplication of the number of equivalent phases of the converter, by resorting, at least for some of the elementary conversion stages, to connections or couplings of the "zigzag" type in which each phase comprises turns distributed over more than one column of a three-phase transformer.

An important feature of the invention is that the number of transformer winding elements associated with the conversion valves is sufficiently great, so that firstly, the number of valves in series per elementary limb of a conversion stage is sufficiently small for the commutation operations not to raise difficult problems of voltage distribution at the beginning and end of the switching actions, at the limit, this number may be reduced to one; and secondly, the voltage brought into action in a single winding element or between contiguous elements are sufficiently low to allow of conveniently establishing connections from column to column of the transformer abreast of certain winding elements, in such manner as to establish the phases of these elements by connecting turns apertaining to at least two columns in series, as in the zig-zag couplings.

In the sphere of low or moderate conversion members, it has already been suggested that rectifying devices be employed, wherein the secondary or high-tension winding of a three-phase transformer is subdivided into elements of which each, together with a set of associated valves, forms an elementary conversion stage of three-phase or six-phase characteristic, and wherein a conversion column is formed by connecting these elementary stages in series. This made it possible to form twelve-phase conversion aggregates with a transformer having three wound columns. To go further, it would have been necessary to resort to zig-zag windings at the rectifier side, requiring multiple connections from column to column of the transformer. It seems plain however that the connections of this nature had hitherto been considered to be impractical in the case of high power transformers operating at high voltages of the order of those recommended at present for energy transport in the form of direct current.

In this respect, one of the facets of the present invention resides in the discovery of the possibility and of the advantages of systematically resorting to this zig-zag connection method in at least some of the elementary stages of a conversion assembly comprising a polyphase transformer. This possibility is linked with the fact that, contrary to the case of the transformers having a continuous winding, in the case of the fractional winding along a column of associated valves, the potentials of the different phases of the winding do not differ, at any one stage, except by the low value component produced by this particular stage. No serious problems thus exist any longer in respect of insulation in arranging connections between different phases of one and the same stage of the transformer: the potentials between adjacent connections belonging to the elements of one and the same stage or consecutive stages are always relatively low.

In order to obtain the desired compactness, provision is made in an arrangement according to the invention for the columns of variable conductivity valves, together with their direct ancillaries of, for example, control or protection, as may be required, to be situated in the immediate vicinity of the transformer columns, either within the transformer case or in one or more compartments adjacent to this case. The compartment or compartments containing the valves and their auxiliary equipment may be separated from the windings by insulating partitions traversed by the connections of the different stages. The cooling fluids may then be different.

The windings and the columns of valves are advantageously arranged in such manner that the valves and their control and protection elements, are easily accessible and replaceable. To this end, specifically in the case in which the valves are immersed in a liquid, the columns of valves will either be placed in a horizontal position, or in a more or less inclined position to adapt the level of liquid above the valves to the needs of the insulation, which may be different between one extremity of the columns and the other. It is then possible to gain access to the valves for maintenance, replacement or shunting, from the top of the liquid bath, without having to perform any substantial draining. A particularly compact arrangement will consist of placing the columns of the transformer horizontally below the column of the conversion valves.

Figure 2:
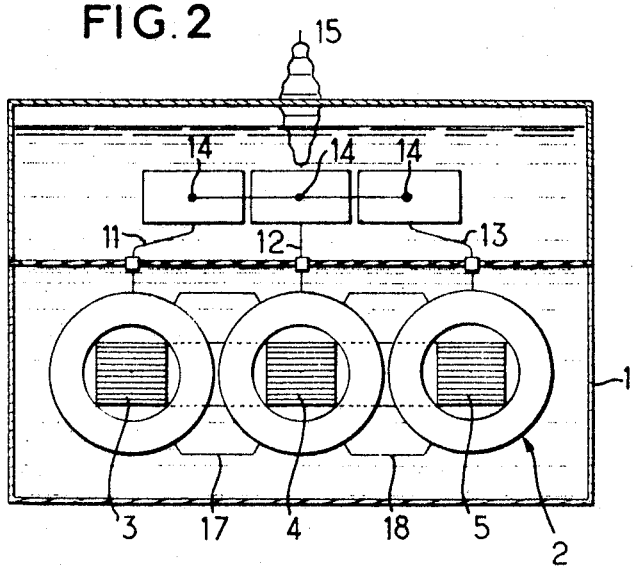
Figure 3:
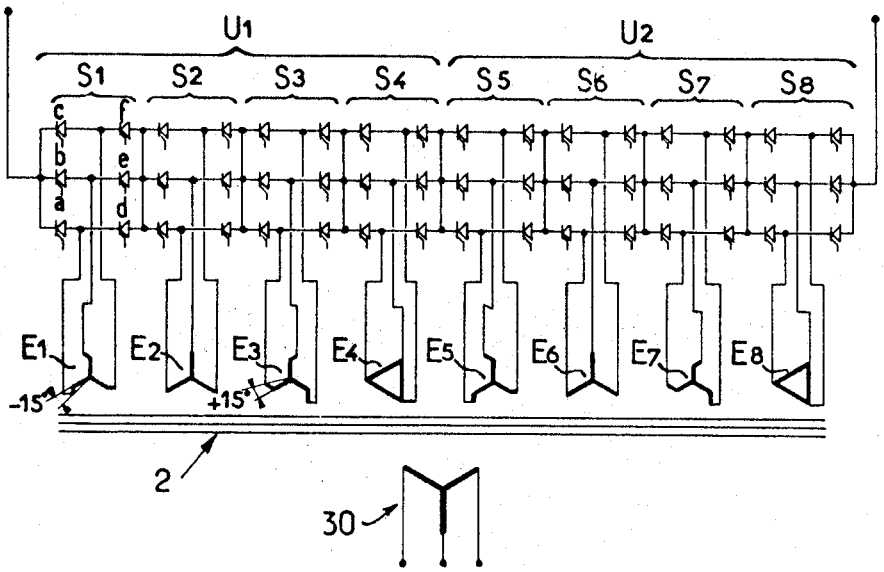
Figure 4:
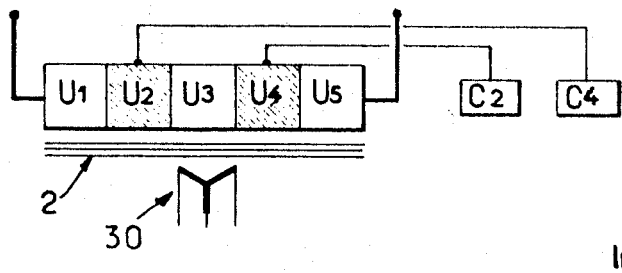

In order that the invention may be more clearly understood some embodiments thereof will now be described, by way of example, with reference to the accompanying drawings, in which:

FIGURE 1 is a schematic view in elevation of a particular arrangement of the elements of a high power converter according to the invention, which renders it possible to obtain great compactness of the assembly at the same time as maintenance facilities, FIGURE 2 is a schematic view in cross-section along the line II—II of FIGURE 1, FIGURE 3 is a fundamental electrical diagram of a twenty-four-phase high power converter according to the invention, and FIGURE 4 is a symbolic diagram of a converter assembly comprising five sub-assemblies.

Each of the elementary conversion stages may be provided according to conventional techniques, with any conventional auxiliary devices such as auxiliary valves, condensers, inductances, protective or shock-absorbing or damping devices. In order to simplify and clarify the present description, no reference will be made in detail to these conventional auxiliary devices as a whole, nor to known equipment for low-power control over the response instants and/or blocking instants in the conduction of the different valves. These will be illustrated in the diagrams in the form of simple diodes, although it is understood that these valves may, as a rule, be valves controlled by any appropriate devices whose conventional arrangement may easily be established according to well-known techniques as a function of the conditions required in each particular application.

Firstly, referring to FIGURES 1 and 2, a converter assembly illustrated by way of example comprises, within a case 1 filled with oil, a three-phase transformer 2 whose magnetic circuit comprising three columns 3, 4, 5 is positioned horizontally on supports 6, 7. The primary winding, (not shown in detail), is connected to an alternating current grid by means of terminals such as 8, 9. The secondary winding is divided on each of the transformer branches into a series of elements or stages E1 to E8. The three phases of the winding elements situated at each of these stages are associated by means of connections such as 11, 12, 13 with associated sets S1 to S8 of variable conductivity valves. The polyphase conversion stages thus formed are joined together in series by means of connections such as 14, in such manner as to form a conversion column between the terminals 15, 16 to which one may, for example, connect a high-tension D.C. energy transport conductor. Connections such as 17, 18 (FIG. 2) are established between winding elements of the three transformer columns having different stages.

The sets of conversion valves S are housed within an enclosure 20 separated from the case 1 of the transformer by a partition 21, preferably of insulating material, traversed by the connections such as 11, 12 and 13 between winding elements and sets of valves. They are immersed in an insulating liquid 22 which ensures their cooling. The enclosure 20 may be subdivided into several compartments (not shown in detail) and provided with partitions or deflectors in such manner as to ensure effective circulation of the cooling fluid by means of pumps which fluid is cooled in radiators. The chains of valves S are shown in a slightly inclined position in such manner that the depth of insulating liquid lying above them is greatest where the potential is highest. Any other arrangements may be made however to ensure appropriate insulation, specifically the interposition of insulating screens.

The closer positioning of the windings and of the valves of high power converters specified by the invention, which easily allows of their being collected within an enclosure of modest size which is wholly made of metal or partially latticed, eliminates or considerably reduces the high-frequency fields transmitted into space by the connections at the switching instants and which, as known, are liable to give rise to undesirable phenomena such as radio interference.

Any steps may be taken to facilitate detection of damaged elements, their disconnection, shunting and rapid replacement. For example, the valves, certain accessories, or the assembly of a valve stage together with its accessories, may be mounted on pins so as to be easily removable.

Another feature of the invention, which may be applied alone or in combination with the arrangements which have been described, consists of exploiting the great number of conversion stages in series and the resulting low value for the potentials between the phases of one and the same winding element, in order to develop the application of connections between columns of different phases, in such manner as to establish more varied and more highly perfected couplings than in existing embodiments.

FIGURE 3 schematically shows the principal elements of a twenty-four-phase converter arranged in this manner. The primary three-phase winding of the transformer is shown at 30. The winding associated with the conversion members is divided into eight elements grouped into two identical sub-assemblies U1 and U2, the first comprising the elements marked E1 to E4 and the second the elements marked E5 to E8. These winding elements are connected, respectively, to the conversion stages S1 to S4 and S5 to S8, connected in series, each of these stages comprising, in this case, a set of six valves $a$ to $f$ connected in the manner of a Graetz bridge.

It will be noted that the winding elements E2 and E6 are connected in a "star" coupling, the elements E4 and E8 in a triangle coupling, and the elements E1 and E5, E3 and E7 in staggered or zig-zag connections with unequal branches. The number of turns are chosen in such manner that all the elements generate potentials of equal amplitude and that the corresponding phases, with respect to the star coupling, amount to $-15°$ for E1 and E5, 0 for E2 and E6, $+15°$ for E3 and E7, and 30° for E4 and E8.

Each of the sub-assemblies U thus has the characteristics of a converter having twenty-four electrical phases with commutation every 15°.

In the same way, by appropriately adjusting and connecting the branches of the staggered connections, one may obtain other phase difference angles, which make it possible to go even further in the multiplication of the number of phases.

The modest value of the potentials brought into action in one and the same winding element easily makes it possible to make the column to column connections required for the staggered couplings, whereas it has not been possible hitherto to employ such connections in the high power converters of the high-tension type.

The increase in the number of phases, thus made possible by the arrangements according to the invention without increase in the number of transformers, has various advantages. In particular, it reduces the harmonics of the rectified voltage and of the currents absorbed in the A.C. grid, it determines the magnitude of the shocks or surges caused by the switching actions and which engender electrical oscillations of the different elements of the installation and of the grids, and it reduces certain losses in the transformer.

The figures do not give an illustration of the different elements for control and protection of the valves, for shunting a stage, or for damping oscillations. These elements are incorporated in the arrangements according to the invention in the same manner as in known arrangements.

In the example under consideration, the sets of valves forming an elementary stage are connected in a double "track" bridge of six-phase characteristic, which is frequently called a Graetz circuit. Any other connection methods may however be employed according to the invention.

On the other hand, each limb (or branch) of an elementary conversion stage illustrated in the circuit diagram of FIGURE 3 by a diode, may comprise a plurality of valves in series, in parallel, or in series-parallel connection. These valves will be provided with elements for controlling the switching instants as required.

The valve control devices may be actuated by any appropriate means, such as magnetic or luminous devices. The fact that each stage operates in independent manner with a small number of valves only in series, or with a single valve even, has the consequence that the problem of strictly simultaneous control of a great number of valves in series no longer arises, or loses its seriousness.

Other devices which can be subdivided into stages may be connected direct to the winding elements, in particular condensers which produce the whole or port of the reactive power consumed by the converter, and may even feed it into the A.C. grid, and whose presence is liable to facilitate the process of switching current between valves of different phases. Oscillation damping devices, for the oscillations engendered by the switching actions, voltage limiters, fuses, or by-pass valves, may also be combined with the conversion elements.

These devices, or some of them, may thus be arranged on stage sub-assemblies.

The invention also makes possible the provision of all or part of the elementary conversion stages or of stage sub-assemblies, with positively controlled switching devices allowing the switching actions to be caused at instants at which the natural potentials would be inadequate (or unavailable) for example, by means of appropriate oscillating circuits equipped with auxiliary valves, or by employing principal valves of special type equipped with control units which cause direct interruption of the current traversing these, at the scheduled instant.

Attention may be directed to protection against eventual failures of the auxiliary valves or circuits. The destruction of valves of one stage may cause a short-circuit, but owing to the small number of turns in question, the shock on the transformer as a whole is small. In exchange, the winding element may require protection, for example by means of fuses. The faulty conversion element, or the sub-assembly of which it forms part, may if required, be by-passed by means of an auxiliary device operated automatically or manually. The converter as a whole may frequently continue to operate in temporarily admissible conditions, with one or more conversion stages out of action.

In general manner, the winding of the transformer will be subdivided in such manner as to form a plurality of sub-assemblies in selected number, in order to come close to the optimum number of winding elements, which has been referred to above. It is to be preferred that the stages comprising identical couplings and in which the switching actions are simultaneous should be distributed regularly throughout the height of the transformer columns in order to reduce switching reactances in particular.

Subdivision of the converter into a multiplicity of elementary stages may be accompanied by differentiated control of these stages or sub-assemblies they form. This feature may be exploited in particular to reduce the reactive power consumption and the harmonics caused by voltage control by retardation of the switching instants. For example, the task of voltage regulation may be entrusted to a limited number of conversion stages which are made to work between operation under full voltage as a rectifier and operation at full voltage as an inverter or oscillator (operating conditions for which the consumption of reactive power as well as the harmonics factor are the lowest). For their part, the other stages are then able to operate at a fixed potential equal to full potential or close to this value. It is not essential for the stage sub-assembly or sub-assemblies assuring regulation to possess the same equivalent number of phases as the rest of the converter, especially if the range of regulation is modest.

FIGURE 4 thus illustrates, in symbolic manner, a conversion unit having five stage sub-assemblies U1 to U5, in which the sub-assemblies U1, U3 and U5 operate at fixed potentials, whereas the sub-assemblies U2 and U4 are connected, respectively, to devices C2 and C4 for controlling the switching instants, adapted to allow regulation of the operation at various rates liable to be selected, between operation at full potential as a rectifier and operation at full potential as an inverter.

Known methods of asymmetrical control of the response instants of successive valves may be employed, which equally ensure a lesser consumption of reactive power and a reduction of harmonics for a given voltage regulation.

The winding elements of the conversion stages in which the current switching actions between one valve and the following one are simultaneous, are advantageously arranged in the transformer in the manner minimizing the switching reactances. The switching reactions of such a group of stages on the other stages may, in certain cases, by reduced by reduction of the couplings between stages whose switching actions are not simultaneous.

Although the preceding description has primarily dealt with converters of alternating voltage into direct voltage or vice versa, the invention may equally be applied to converters employed for direct frequency conversion.

I claim:

1. A conversion assembly for use in a high-power, high-voltage converter for energy exchange between two current systems, one of which systems is of the polyphase type, said assembly comprising, in combination:

a polyphase transformer having one wound column per phase of the polyphase system, each column having one primary winding and one secondary winding, the secondary winding on each column being divided into a plurality of winding elements spaced along its associated column, each winding element on one column corresponding with a respective winding element on every other column;

a plurality of sets of low-voltage controlled rectifiers, each set being connected in circuit with one corresponding secondary winding element in each column to form an elementary conversion stage whose output has polyphase characteristics and all of said sets of rectifiers being disposed adjacent one another to extend in a straight line;

a container containing a bath of insulating cooling liquid in which all of said rectifiers are immersed;

first conductor means connecting the outputs of said elementary stages together in series; and second conductor means associated with one of said elementary stages and connecting together, in series, at least parts of two elementary winding elements of said one stage for establishing the phases of said stage;

wherein the line defined by said sets of rectifiers is inclined with respect to the surface of said bath in such a manner that the depth of liquid above any one rectifier is proportional to the voltage potential at which that rectifier will be placed, with respect to ground, during the operation of said conversion assembly.

2. An arrangement as defined in claim 1 wherein said transformer is composed of three wound columns, each elementary conversion stage presents a three-phase output, and said elementary conversion stages are grouped into at least one conversion stage subassembly composed of four elementary conversion stages, the winding phases of a first one of these four elementary stages being connected together in a Y-configuration, a second one of these elementary stages being connected together in a Y-configuration whose phases are shifted by an angle of $+15°$ with respect to the phases of said first stage, a third one of said stages being connected together in a Y-configuration whose phases are shifted by an angle of $-15°$ with respect to the phases of said first stage, and the fourth of said stages being connected together in a delta-configuration whose phases are shifted through an angle of $30°$ with respect to the phases of said first stage.

3. An arrangement as defined in claim 1 wherein said elementary stages are grouped into a succession of conversion stage subassemblies each composed of several elementary stages, with the winding elements of each elementary stage being connected together in a different manner from the winding elements of the other elementary stages of the same subassembly so that the phases of each elementary stage are shifted with respect to the phases of every other elementary stage of the same subassembly, whereby each subassembly presents a number of phases equal to more than four times the number of columns of said transformer.

4. An arrangement as defined in claim 3 wherein said subassemblies are arranged in succession along said columns and are identical with one another with regard to the manner of connection of the winding elements of their associated elementary stages, with identical elementary stages of successive subassemblies being spaced regularly along said columns.

5. An arrangement as defined in claim 1 comprising a further container disposed below said first-mentioned container and containing a liquid bath in which said transformer is immersed.

6. An arrangement as defined in claim 5 wherein columns of said transformer are oriented horizontally in said further container.

References Cited

UNITED STATES PATENTS

| | | | |
|---|---|---|---|
| 1,905,629 | 4/1933 | Corbitt. | |
| 2,024,739 | 12/1935 | Maslin et al. | 321—27 |
| 2,334,045 | 11/1943 | Temple et al. | 321—27 |
| 2,243,558 | 5/1941 | Goodhue | 321—5 |
| 2,299,094 | 10/1942 | Klemperer | 321—27 |
| 2,790,131 | 4/1957 | Nyyssonen | 321—57 |
| 3,049,642 | 8/1962 | Quinn. | |
| 3,173,061 | 3/1965 | Storsand | 317—100 |

FOREIGN PATENTS

| | | |
|---|---|---|
| 761,239 | 11/1956 | Great Britain. |
| 1,111,279 | 7/1961 | Germany. |

JOHN F. COUCH, *Primary Examiner.*

W. H. BEHA, JR., *Assistant Examiner.*

U.S. Cl. X.R.

321—8, 11; 336—5